(12) United States Patent
Chang

(10) Patent No.: US 7,387,284 B2
(45) Date of Patent: Jun. 17, 2008

(54) MECHANISM FOR FASTENING A PIVOTAL SUPPORT IN ANY DIRECTION

(76) Inventor: Ta Shuo Chang, 3F. No. 37, Sec. 3, Muja Rd., Taipei (TW)

( * ) Notice: Subject to any disclaimer, the term of this patent is extended or adjusted under 35 U.S.C. 154(b) by 170 days.

(21) Appl. No.: 11/346,335

(22) Filed: Feb. 3, 2006

(65) Prior Publication Data
US 2007/0138358 A1 Jun. 21, 2007

(51) Int. Cl.
*F16B 47/00* (2006.01)
(52) U.S. Cl. .................... 248/206.5; 108/7; 248/181.1; 248/205.5; 248/516
(58) Field of Classification Search ............ 248/205.5, 248/206.2, 206.3, 362–363, 516, 518, 181.1, 248/181.2, 288.31, 288.51, 519, 205.8; 108/7, 108/8
See application file for complete search history.

(56) References Cited

U.S. PATENT DOCUMENTS

| 282,551 | A | * | 8/1883 | McLean | 89/9 |
| 538,534 | A | * | 4/1895 | Neill | 108/8 |
| 2,742,251 | A | * | 4/1956 | Udvardy | 248/205.5 |
| 3,910,620 | A | * | 10/1975 | Sperry | 294/64.1 |
| 4,988,065 | A | * | 1/1991 | Leban et al. | 248/181.1 |
| 5,280,871 | A | * | 1/1994 | Chuang | 248/516 |
| 6,435,186 | B1 | * | 8/2002 | Klemm | 128/845 |
| 7,229,059 | B1 | * | 6/2007 | Hood | 248/518 |
| 7,241,069 | B2 | * | 7/2007 | Richter | 403/122 |
| 7,246,781 | B2 | * | 7/2007 | Nam | 248/516 |

* cited by examiner

Primary Examiner—Amy J. Sterling
Assistant Examiner—Tan Le
(74) Attorney, Agent, or Firm—Troxell Law Office, PLLC

(57) ABSTRACT

A fastening mechanism is mounted on a suction cup including a pivotal ball in a receptacle and having surface recesses, a leg secured to the ball, and a channel open to both the external and the receptacle, the channel having an intermediate enlargement. The mechanism includes a shank in the channel and having an exposed end, a rod extended from the other end of the shank and inserted in the recess, a shoulder proximate the rod, and a resilient member compressed between the shoulder and an internal wall of the channel. Pulling the shank to clear the recess and compress the resilient member, pivoting the ball by rotating the leg until a predetermined angle thereof relative to the suction cup is obtained, and releasing the shank to cause the compressed resilient member to expand to push the shoulder will insert the rod in the adjusted recess and fasten the ball.

2 Claims, 7 Drawing Sheets

MECHANISM FOR FASTENING A PIVOTAL SUPPORT IN ANY DIRECTION

BACKGROUND OF THE INVENTION

1. Field of Invention

The present invention relates to fastening mechanism incorporating suction devices and more particularly to a spring-biased mechanism for fastening a pivotal support formed on a member (e.g., suction cup) in any direction.

2. Description of Related Art

Conventionally, a portable electronic device (e.g., mobile phone, PDA (Personal Digital Assistant), smartphone, DVD, VCD, LCD, or the like) is fixedly mounted on a place (e.g., instrument board of an automobile) by securing to a fixed cradle. This has the drawback of being impossible of adjusting an angle of the device.

As disclosed in the art, a pivotal support secured to cradle is for holding a mobile phone in a desired using position. However, there is no optionally fastening mechanism for the support provided. Thus, the support may pivot after being positioned. Such undesired pivoting is especially significant after a period of time of use. Thus, a need for improvement exists.

SUMMARY OF THE INVENTION

It is therefore an object of the present invention to provide a fastening mechanism mounted on a suction cup for fastening a pivotal support in any optional direction so as to provide an electronic device attached on the support on any desired direction.

In an aspect of the present invention there is provided a receptacle, a pivotal ball provided in the receptacle, the ball having a plurality of recesses formed thereon, a support leg fixedly secured to the ball, and an inclined channel having one end open to the external and the other end in communication with the receptacle.

In another aspect of the present invention the fastening mechanism comprises a shank disposed in the inclined channel and having an exposed one end and an other end of the shank inserted in one of the recesses of the ball; and a resilient member disposed in the channel to serve the shank being compressively inserted into one of the recesses of the ball; whereby pulling the shank to clear the recess and compress the resilient member, pivoting the ball by rotating the support leg until a predetermined angle thereof relative to the suction cup is obtained, and releasing the shank to cause the compressed resilient member to expand to push the shank inward to insert in the recess and to fasten the ball.

In other aspect of the present invention the resilient member is a spring.

In a further aspect of the present invention the receptacle is substantially spherical or has a substantially arcuate inner surface.

The above and other objects, features and advantages of the present invention will become apparent from the following detailed description taken with the accompanying drawings.

DETAILED DESCRIPTION OF THE INVENTION

Figure 1:
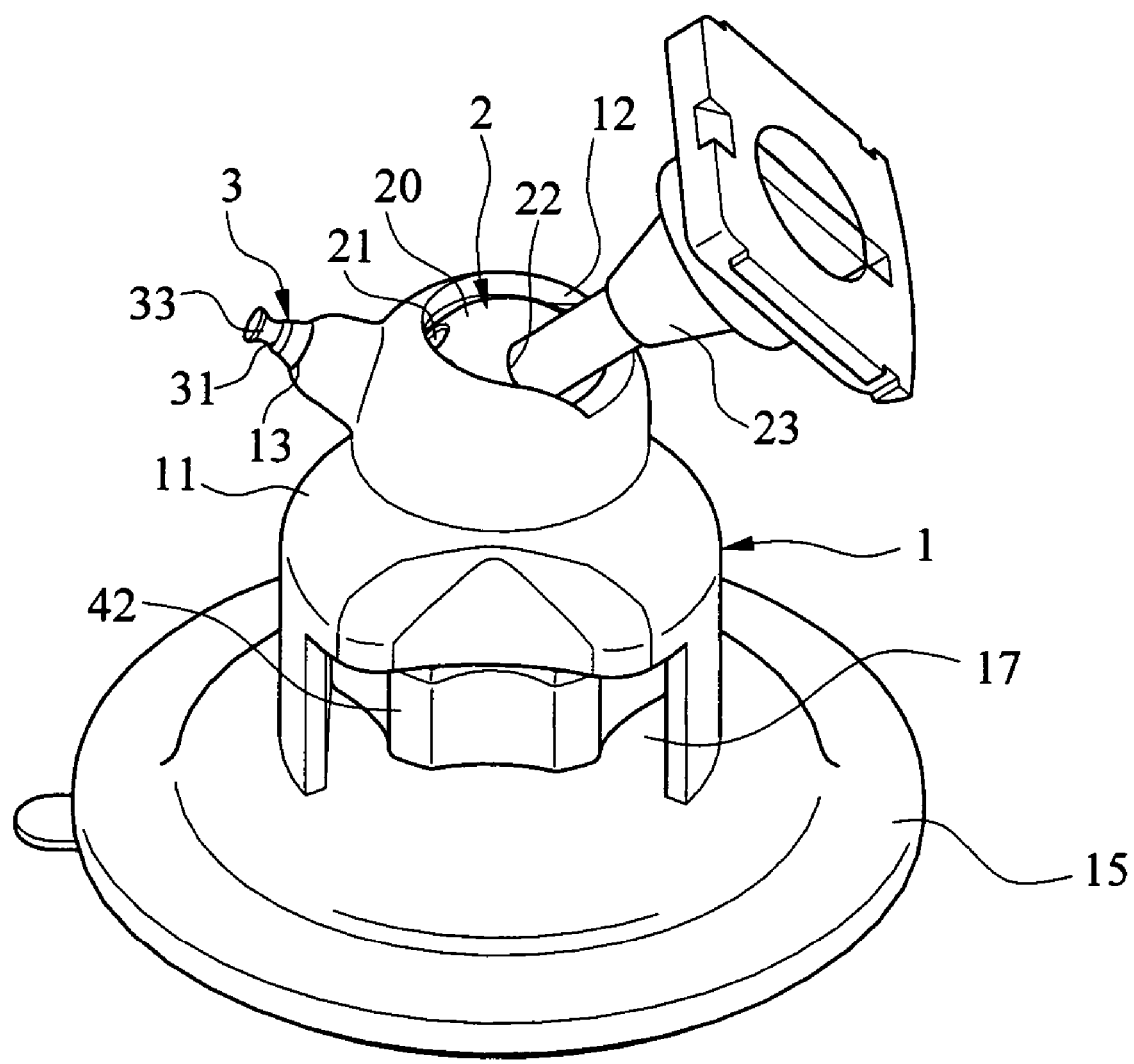
FIG. 1 is a perspective view of a suction cup incorporating a preferred embodiment of fastening mechanism according to the invention.
Figure 2:
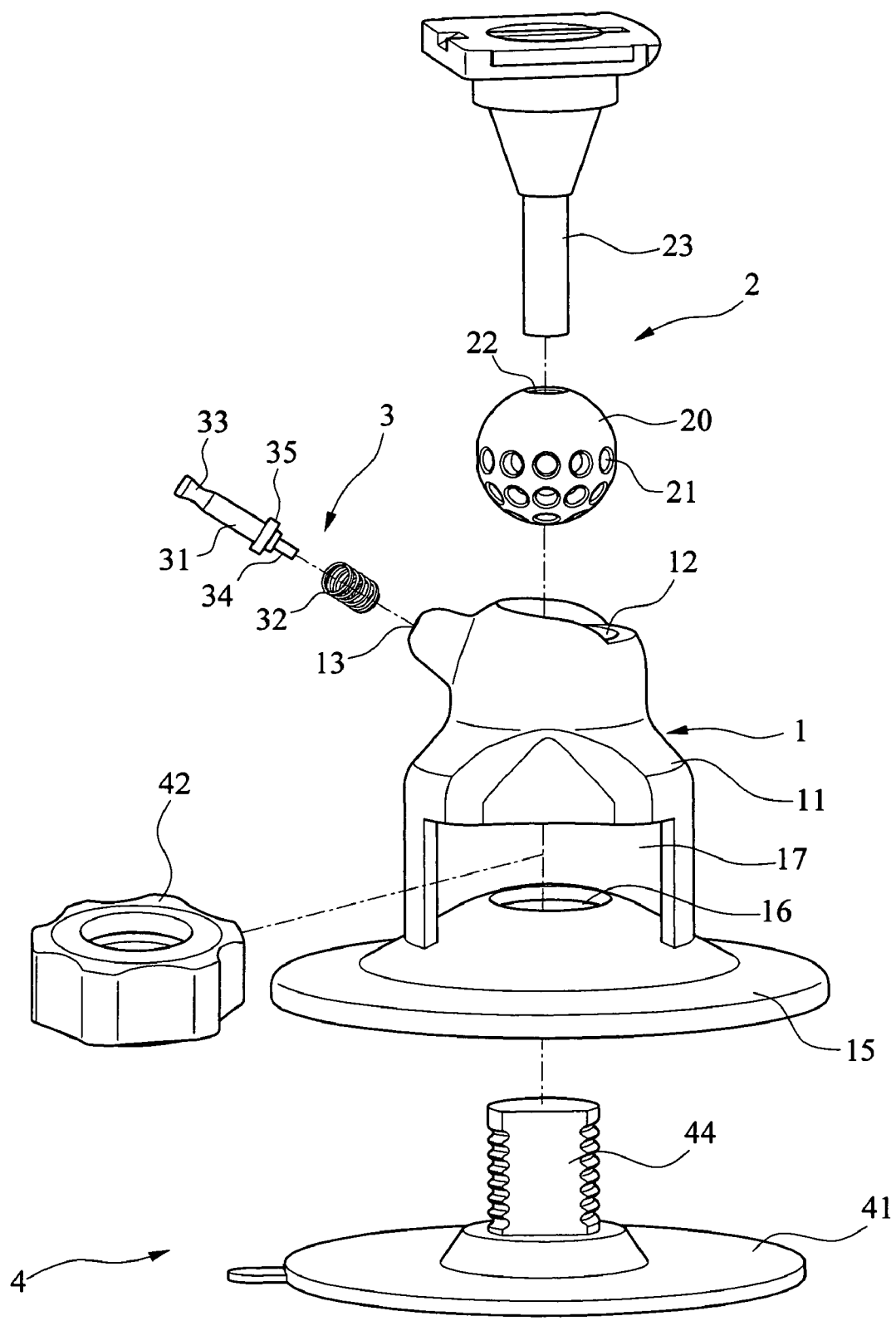
FIG. 2 is an exploded view of FIG. 1.
Figure 3:
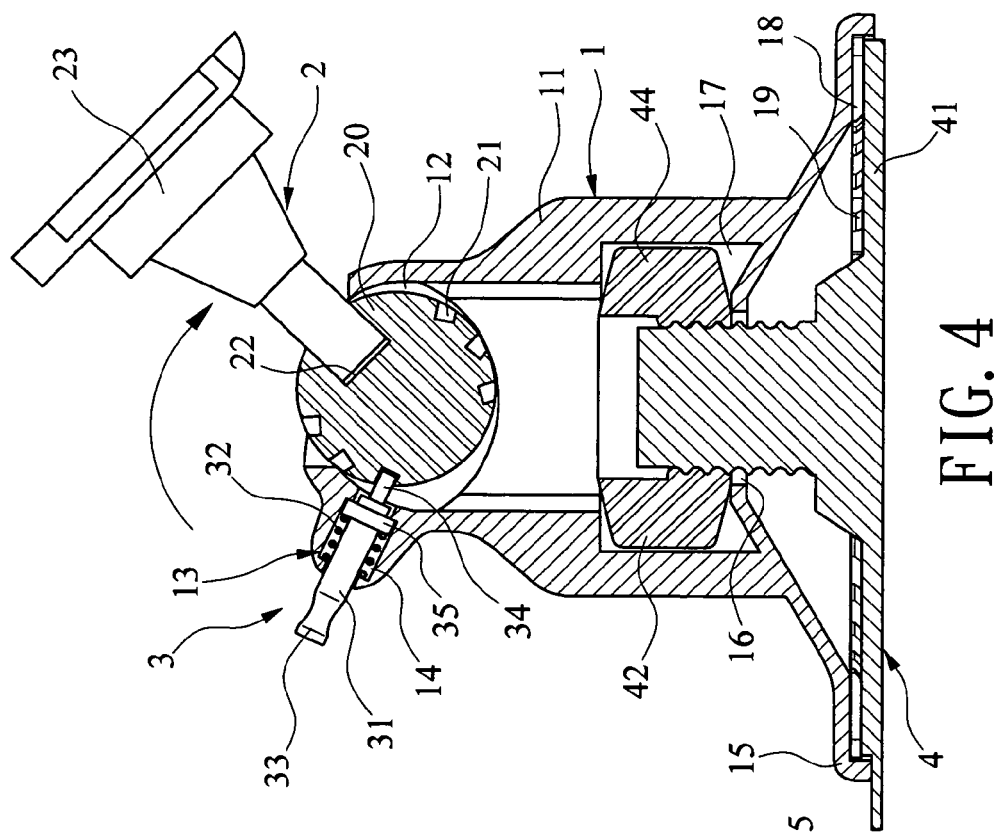
FIG. 3 is a cross-sectional view of the invention in its assembled state.

Referring to FIGS. 1 to 3, a fastening mechanism mounted on a suction cup in accordance with a preferred embodiment of the invention is illustrated. The suction cup comprises a bell 1 including a body 11, a substantially spherical receptacle (or arcuate cavity in other embodiments) 12 on an upper end of the body 11, an inclined channel 13 having one end open to the external and the other end in communication with the receptacle 12, an enlargement 14 in an intermediate portion of the channel 13, a bottom disc 15 having an inwardly extending rim, an internal space 17 open to both lateral sides of the body 11, and a central opening 16 formed on a top of the disc 15 and being in communication with the space 17; a pivotal support assembly 2 including a ball 20 pivotably provided in the receptacle 12, a plurality of recesses 21 formed on an outer surface of lower half of the ball 20, a hole 22 formed on a center of an upper half of the ball 20, and a leg 23 fixedly inserted in the hole 22, the leg 23 having an enlarged, flat open end; a positioning assembly 3 disposed in the channel 13 and including a shank 31, a depressed portion 33 adjacent an exposed outer end, a rod-shaped extension 34 formed at an inner end and inserted in one of the recesses 21, a shoulder 35 proximate the extension 34, and a spring 32 disposed in the enlargement 14 and compressed between the shoulder 35 and an internal wall of the channel 13; and an attachment assembly 4 including a bottom plate 41, a central projecting middle post 44 having outer threads passed the opening 16, a nut 42 provided in the space 17 and put on the middle post 44 to threadedly engage therewith, an annular pressing member 18 put on the bottom plate 41 and being disposed inside a concave bottom of the body 11 and being in contact with the rim of the disc 15, and a plurality of pressing elements 19 in the form of arcuate ribs, teeth or the like formed on a bottom of the pressing member 18.

Figure 4:
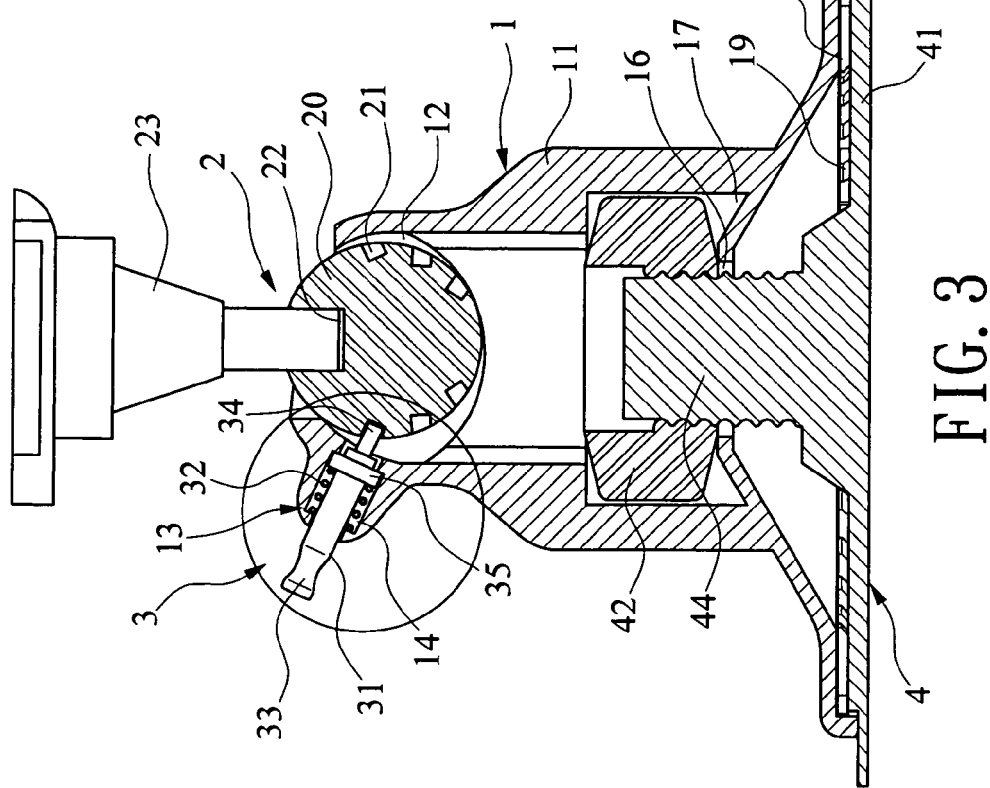
FIG. 4 is a view similar to FIG. 3 where the support assembly has pivoted to a predetermined angle and fastened thereat.
Figure 5A:
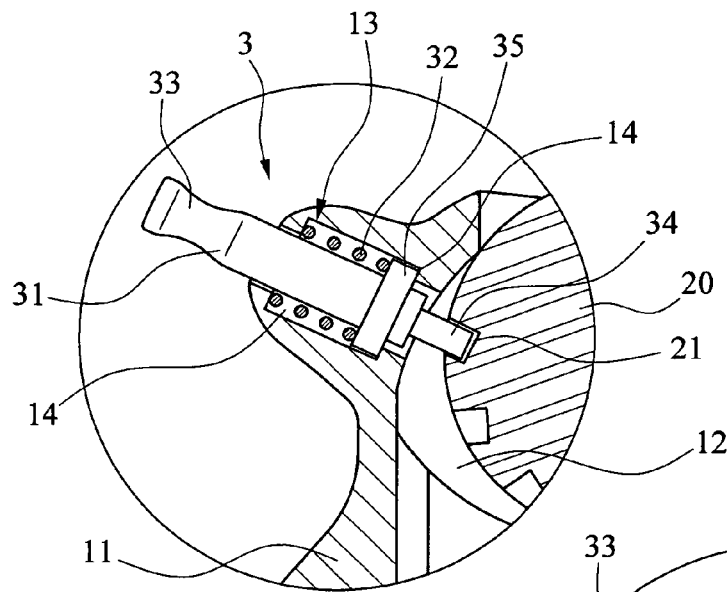
FIG. 5A is a detailed view of the area in circle of FIG. 3.
Figure 5B:
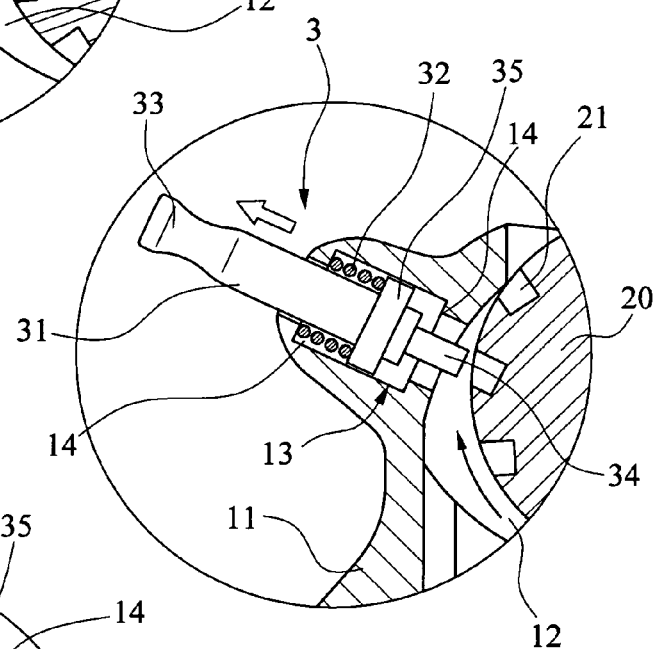
FIG. 5B is a view similar to FIG. 5A where the shank is pulled prior to pivoting the support assembly.
Figure 5C:
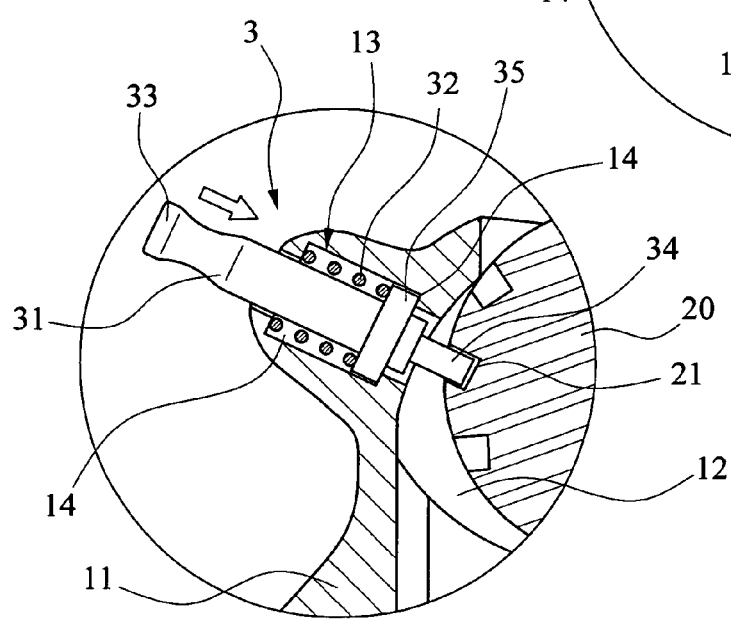
FIG. 5C is a view similar to FIG. 5A where the shank is released for fastening the support assembly after the support assembly has pivoted to a predetermined angle.

Referring to FIGS. 4 and 5 in conjunction with FIG. 3, an any angle adjustment operation of the invention will be described in detailed below. First, pull the shank 31 outward by holding the depressed portion 33 to cause the shank 31 to clear the recess 21 with the spring 32 being compressed. Next, pivot the ball 20 by rotating the leg 23 until a desired angle of the support assembly 2 relative to the bell 1 is obtained. Finally, release the shank 31 to cause the compressed spring 32 to expand to push the shoulder 35 inward for inserting the extension 34 in the adjusted recess 21 and thus fastening the ball 20 (i.e., support assembly 2). This angle adjustment operation is quick and the obtained fastening is reliable.

Figure 6:
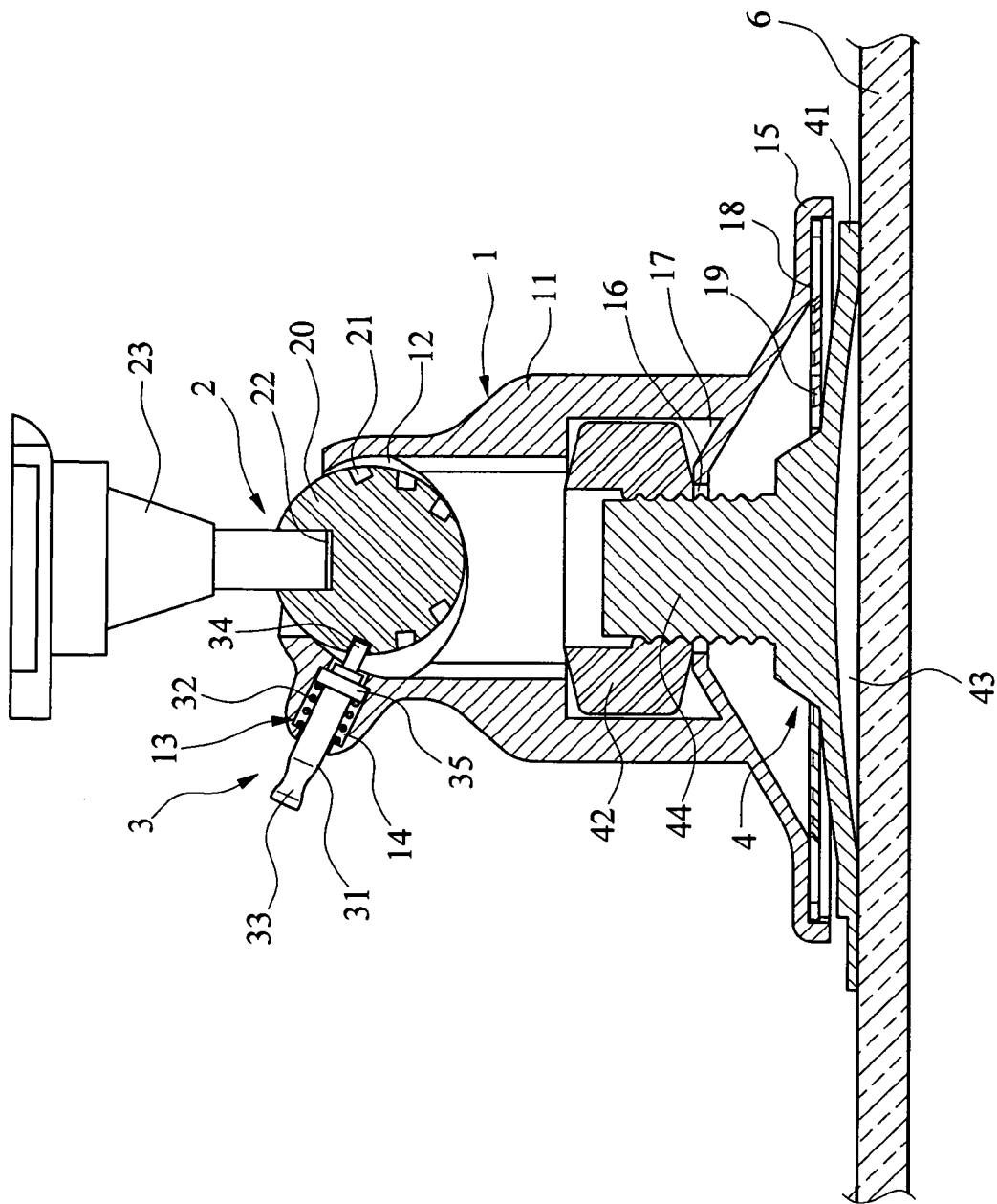
FIG. 6 is a view similar to FIG. 3 where the suction cup is in its inoperative state.
Figure 7:
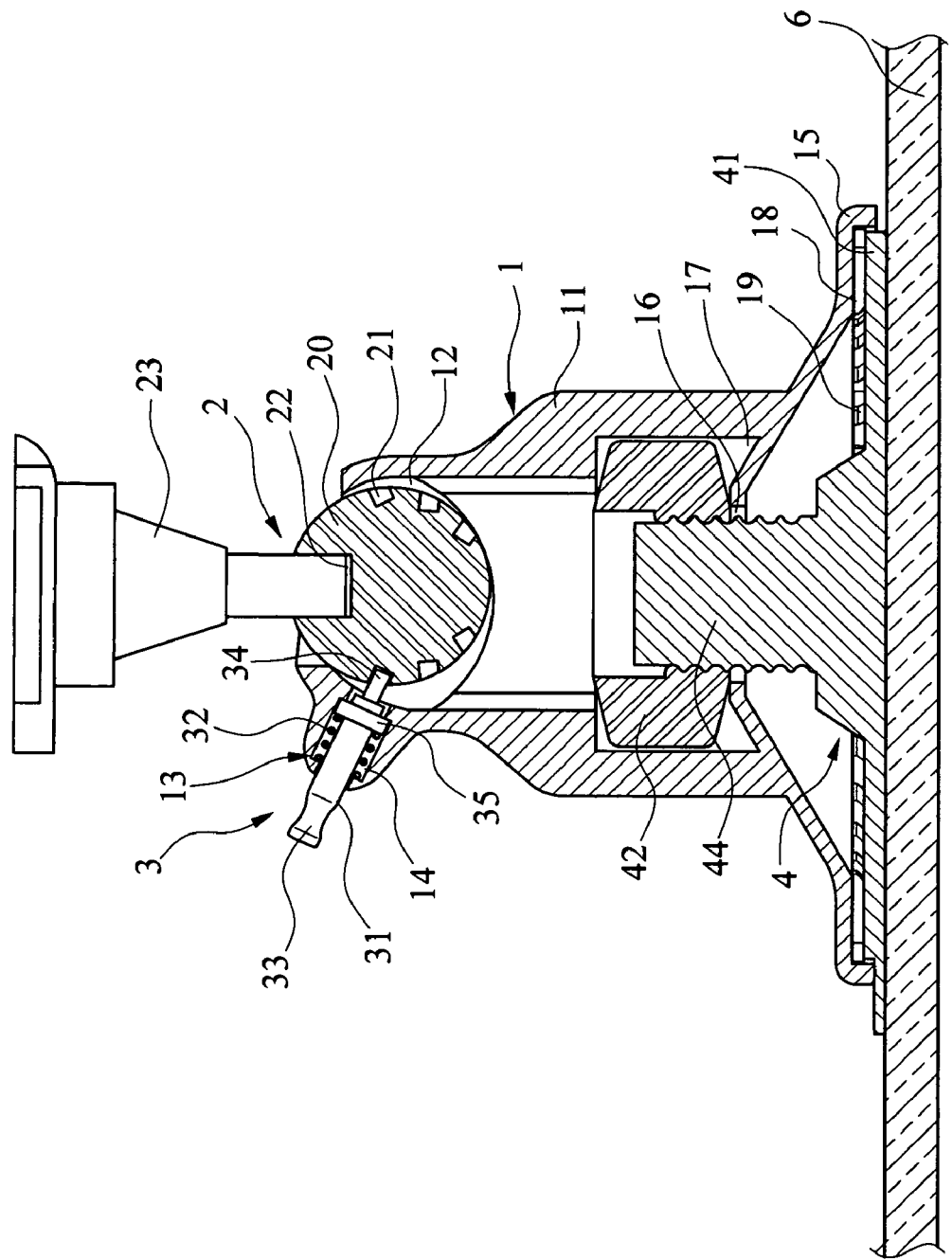
FIG. 7 is a view similar to FIG. 3 where the suction cup is in its operating state.

Referring to FIGS. 6 and 7, a sucking operation of the invention will be described in detailed below. Place the suction cup onto a flat surface 6. Next, continuously turn the nut 42 with one hand to draw both the middle post 44 and the disc 15 (i.e., the bell 1) toward the surface 6 and draw the pressing member 18 toward the plate 41 until a cavity 43 defined by the plate 41 and the surface 6 is decreased to about zero in order to create a vacuum for causing the plate 41 (i.e., the suction cup) to adhere to the surface 6. Note that the sucking force is greatly enhanced since the pressing elements 18 are urged against the plate 41 by excessively tightening the nut 42. As a result, the suction cup is immovably and captively retained on the surface 6 by the created vacuum.

Figure 8:
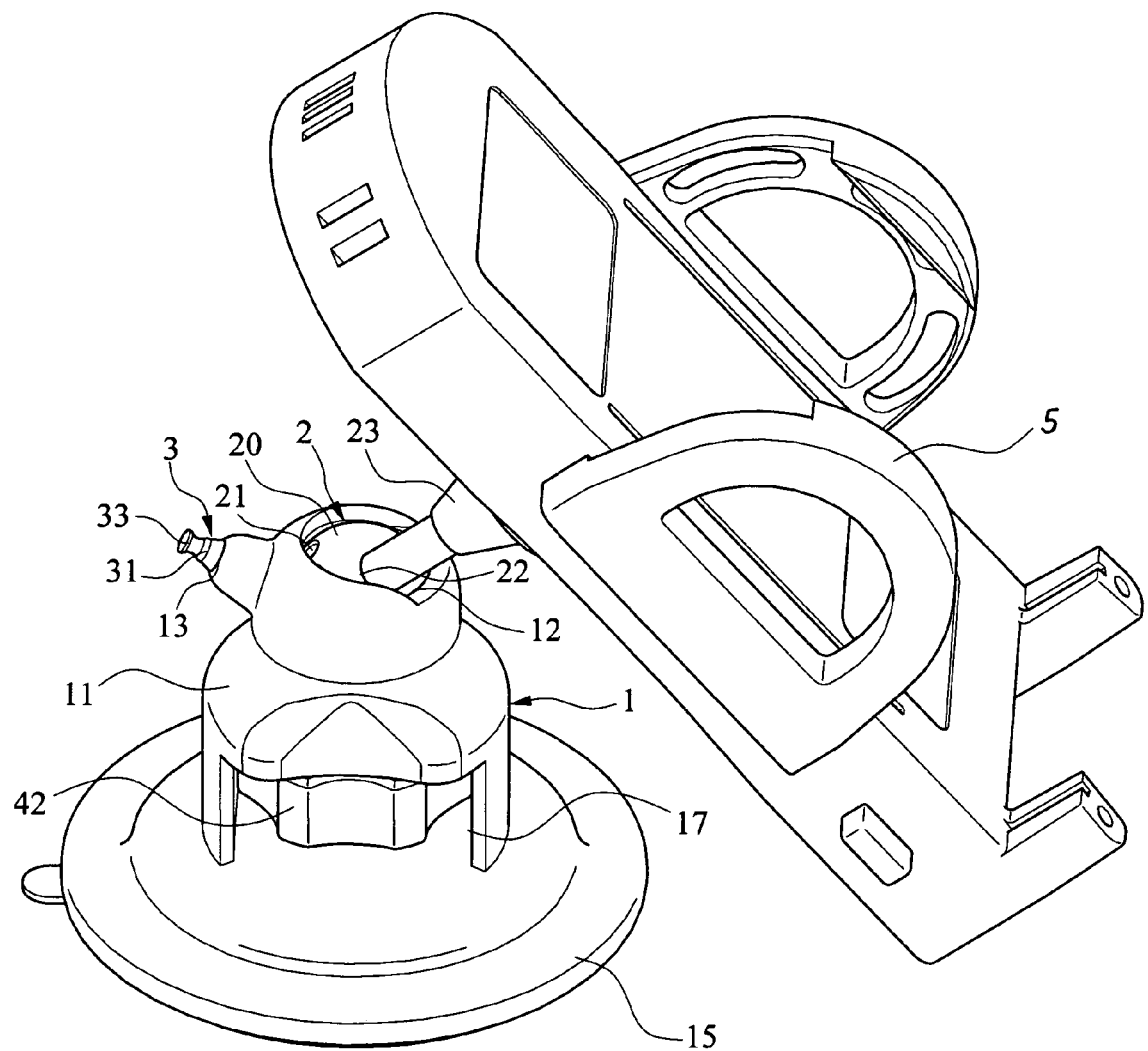
FIG. 8 is an environmental view of the suction cup with a device cradle mounted onto the support thereof.

Referring to FIG. 8, an application of the invention will be described in detailed below. The suction cup is mounted on a place (e.g., instrument board of an automobile). A device (e.g., mobile phone, PDA (Personal Digital Assistant), or the like) may be secured to a cradle 5 which is in turn mounted on the support assembly 2 having its ball 20 pivotably provided in the receptacle 12.

While the invention herein disclosed has been described by means of specific embodiments, numerous modifications and variations could be made thereto by those skilled in the art without departing from the scope and spirit of the invention set forth in the claims.

What is claimed is:

1. A fastening mechanism mounted on a suction cup including a receptacle, a pivotal ball provided in the receptacle, the ball having a plurality of recesses formed thereon, a support leg fixedly secured to the ball, and an inclined channel having one end open to the external and the other end in communication with the receptacle, the fastening mechanism comprising:

a shank disposed in the inclined channel and having an exposed one end and an other end of the shank inserted in one of the recesses of the ball; and a resilient member disposed in the channel to serve the shank being compressively inserted into one of the recesses of the ball; and the suction cup comprising:

a resilient circular plate having a middle projecting post and having an outer threads thereon, a central concave portion on a bottom of the projecting post, an annular flat portion on an outer circumferential portion of the concave portion;

a disc including a main body, a spherical receptacle on an upper end of the body, a disc member on a lower portion of the body, an internal space open to both lateral sides of the body, a nut provided in the space, and a central opening on the top of the disc in communication with the space wherein the projecting post passes the opening to threadedly engage with the nut; and an annular pressing member put on the annular flat portion of the resilient circular plate, the pressing member being disposed inside a concave bottom of the disc, the pressing member including an annular member and a plurality of pressing elements on the bottom of annular member, whereby pulling the shank to clear the recess and to compress the resilient member, pivoting the ball by rotating the support leg until a predetermined angle thereof relative to the suction cup is obtained, and releasing the shank to cause the compressed resilient member to expand to push the shank inward to insert in the recess and to fasten the ball.

2. The fastening mechanism of claim 1, wherein placing the suction cup onto a surface and continuously turning the nut will draw both the plate and the disc toward the surface and draw the pressing member onto the plate until a cavity defined by a bottom of the plate and the surface is decreased to about zero for creating a vacuum to adhere the plate to the surface.

* * * * *